United States Patent
Zhang

(10) Patent No.: US 8,917,306 B2
(45) Date of Patent: Dec. 23, 2014

(54) PREVIEWING VIDEO DATA IN A VIDEO COMMUNICATION ENVIRONMENT

(75) Inventor: Nianzu Zhang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 13/194,526

(22) Filed: Jul. 29, 2011

(65) Prior Publication Data

US 2013/0027504 A1    Jan. 31, 2013

(51) Int. Cl.
```
H04N 7/14      (2006.01)
H04L 12/18     (2006.01)
H04N 7/15      (2006.01)
H04L 29/06     (2006.01)
```

(52) U.S. Cl.
CPC ............ *H04L 12/1813* (2013.01); *H04N 7/152* (2013.01); *H04L 65/1069* (2013.01)
USPC ......................................... 348/14.01; 725/25

(58) Field of Classification Search
USPC ........................................... 348/14.01–14.09
See application file for complete search history.

(56) References Cited

U.S. PATENT DOCUMENTS

| | | | |
|---|---|---|---|
| 6,546,092 B2 | 4/2003 | Corbett et al. | |
| 6,990,181 B2 | 1/2006 | Corbett et al. | |
| 7,948,513 B2 | 5/2011 | Rockefeller | |
| 8,311,200 B2 * | 11/2012 | Kang | 379/202.01 |
| 8,428,227 B2 * | 4/2013 | Angel et al. | 379/68 |
| 8,581,953 B2 * | 11/2013 | Kim | 348/14.01 |
| 2003/0041326 A1 * | 2/2003 | Novak et al. | 725/25 |
| 2007/0182811 A1 * | 8/2007 | Rockefeller et al. | 348/14.02 |
| 2008/0062248 A1 * | 3/2008 | Sahashi | 348/14.01 |
| 2009/0074164 A1 | 3/2009 | Cansler | |
| 2011/0287748 A1 * | 11/2011 | Angel et al. | 455/414.1 |
| 2012/0266107 A1 * | 10/2012 | Bates et al. | 715/838 |
| 2014/0007148 A1 * | 1/2014 | Ratliff et al. | 725/12 |
| 2014/0051413 A1 * | 2/2014 | Kim | 455/415 |

\* cited by examiner

*Primary Examiner* — Maria El-Zoobi
(74) *Attorney, Agent, or Firm* — Patent Capital Group

(57) ABSTRACT

In one example implementation, a request from a first endpoint is identified for a second endpoint to join a video communication session. Particular video data captured at the first endpoint is displayed at the second endpoint prior to the second endpoint joining the video communication session. In certain embodiments, the particular video data captured at the first endpoint can be displayed at the second endpoint without the user of the first endpoint being made aware that the particular video data was displayed at the second endpoint.

17 Claims, 6 Drawing Sheets

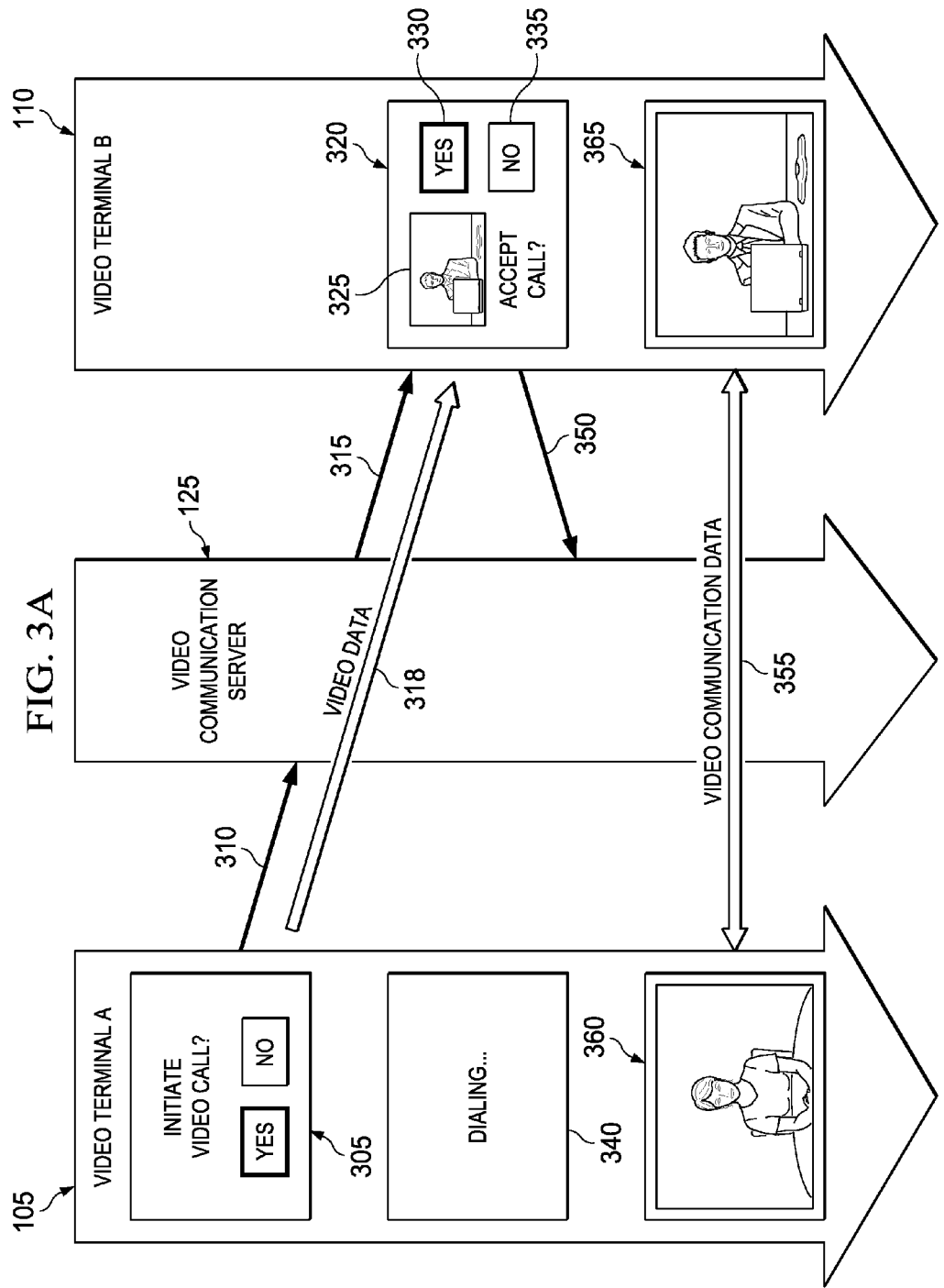

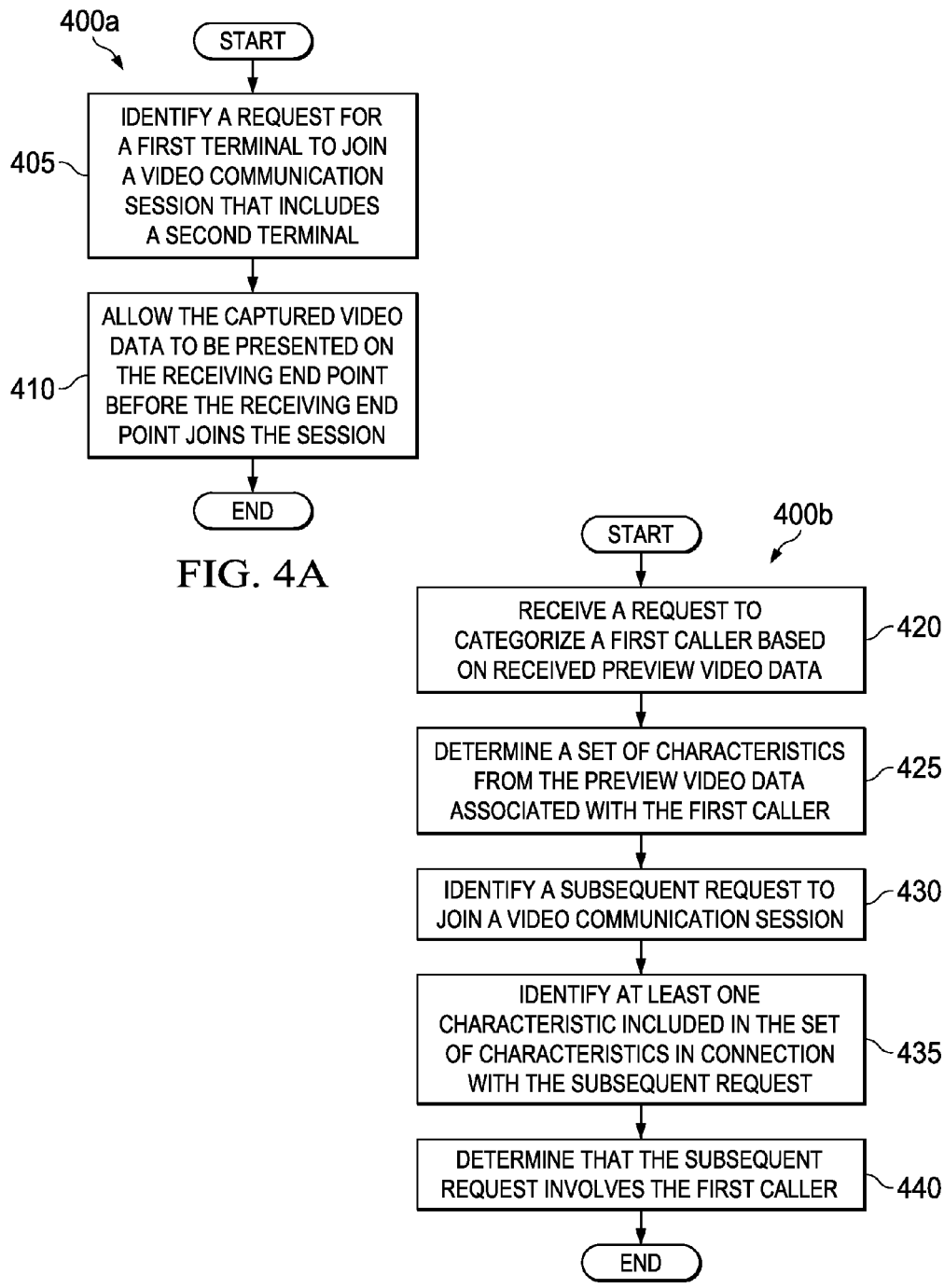

PREVIEWING VIDEO DATA IN A VIDEO COMMUNICATION ENVIRONMENT

TECHNICAL FIELD

This disclosure relates in general to the field of communications and, more particularly, to establishing communication sessions within a video conference environment.

BACKGROUND

Video services have become increasingly important in today's society. In certain architectures, service providers may seek to offer sophisticated videoconferencing services for their end users. The videoconferencing architecture can offer an "in-person" meeting experience over a network. Videoconferencing architectures can deliver real-time, face-to-face interactions between people using advanced visual, audio, and collaboration technologies. In addition to videoconferencing, video communications have been expanding into consumer markets, with service providers providing video chat and other personal video conferencing and communication applications, allowing users to engage in a telephonic conversation that includes both an audio and visual components, allowing the participants to both hear and see the other caller during the communication session.

BRIEF DESCRIPTION OF THE DRAWINGS

FIGS. 3A-3B illustrate representations of example attempts to initiate video communication sessions in accordance with at least some embodiments of the present disclosure; and FIGS. 4A-4B are simplified flowcharts illustrating example operations associated with at least some embodiments of the communication system.

DETAILED DESCRIPTION OF EXAMPLE EMBODIMENTS

Overview

Figure 1:
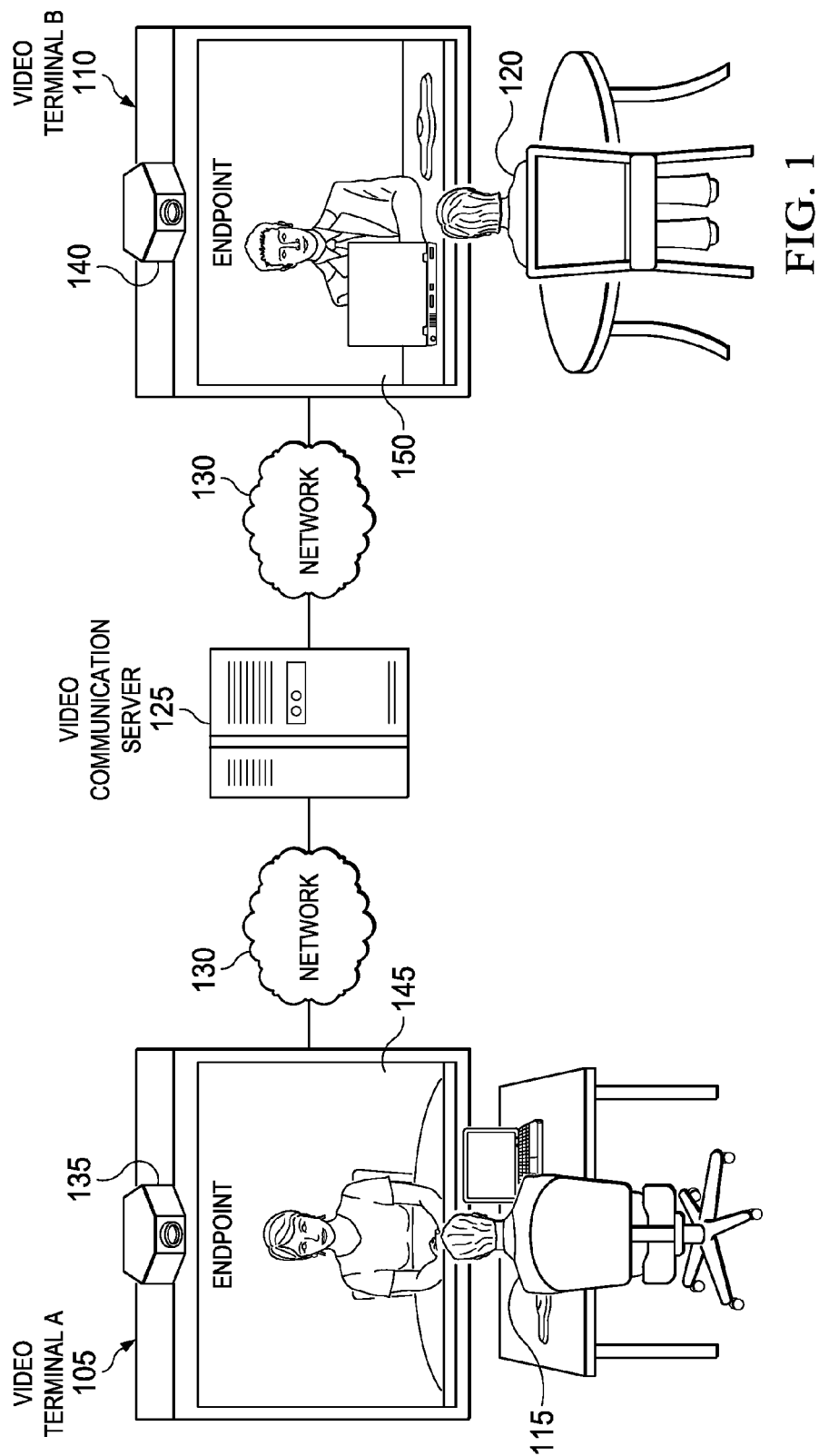
FIG. 1 is a simplified schematic diagram of a communication system for facilitating a video communication session in accordance with one embodiment.

An example method may include identifying a request from a first endpoint, for a second endpoint to join a video communication session. Particular video data captured at the first endpoint can be displayed at the second endpoint prior to the second endpoint joining the video communication session. In another implementation, a system may include a processor, a memory element, and a video communication previewer. The video communication previewer can be configured to identify a request from a first endpoint, for a second endpoint to join a video communication session, where each of the first and second endpoints are configured to receive and send video data within the video communication session, and allow particular video data captured at the first endpoint to be displayed at the second endpoint prior to the second endpoint joining the video communication session.

These and other embodiments can each optionally include one or more of the following features. A confirmation from the second endpoint to join the video communication session can be identified following a display of the particular video data on the second endpoint. The particular video data can be displayed as video data on the second endpoint. The particular video data can be displayed on the second endpoint as a still image. It can be identified that the particular video data includes presentation of a human face before allowing the particular video data to be presented on the second endpoint. A presentation of a human face in the particular video data can be identified. Face data corresponding to the presented human face can be associated with a video caller using the first endpoint.

Furthermore, a response can be identified (received at the second endpoint) indicating whether a video communication session with the video caller is desired. It can be identified that a second request to join a second video communication session includes the video caller based on a facial recognition of preliminary video data (e.g., captured during initiation of the second request), the facial recognition including a comparison of at least a portion of the preliminary video data with the face data.

Further, embodiments can each optionally include one or more of the following additional features. A denial from the second endpoint can be identified declining to join the video communication session following a display of the particular video data on the second endpoint, where the second endpoint does not join the video communication session. A response from the second endpoint can be identified indicating whether a video communication session with first endpoint is desired. An action can be performed corresponding to the second request based on the response. The action can include associating the identified response with an identifier corresponding to the first endpoint. The action can include at least one of blocking the second request, causing an endpoint other than the endpoint associated with the identifier to join the second video communication session, presenting a notification that the second request is associated with the identifier, reporting the second request, joining the second video communication as an audio participant only, and joining the second video communication session anonymously without sharing video data within the session.

In addition, it can be identified that a second request to join a second video communication session includes an endpoint associated with the identifier and a response to the second request can be generated based on the identified previous response associated with the identifier. The first endpoint may not be made aware that the particular video data is displayed at the second endpoint prior to the second endpoint joining the video communication session. Identifying the request from the first endpoint and allowing the particular video data to be displayed at the second endpoint can be performed by a video call server used to establish video communication sessions between the second endpoint and at least one other endpoint. A video call server can include the video communication previewer. An endpoint can include at least a portion of the video communication previewer. The request from the first endpoint can be identified by the second endpoint and the second endpoint can allow the particular video data to be displayed at the second endpoint prior to the second endpoint joining the video communication session.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.
Example Embodiments FIG. 1 illustrates a simplified schematic diagram illustrating an example communication system 100 for conducting a video communication session or video call with two or more participants in accordance with one example embodiment. In some implementations, communication system 100 can additionally be configured to allow one or more participants to preview video call data captured of one or more other participants in the video communication session before joining the video communication session themselves. Video data can, in some instances, include both graphical, photographic, and other data elements presented as video within the communication session. Audio data can also be captured and presented within the video communication session. Video call data, as used herein, can refer to video data used within the video communication session, as well as, in some instances, both the video data and corresponding audio data captured, presented, and shared within a video communication session.

FIG. 1 illustrates two or more video-enabled terminals 105, 110 (which are representative of a type of endpoint) that can be utilized by participants 115, 120 in a video communication session (which encompasses any type of video data transmission between two endpoints). A video communication server 125 can be utilized in connection with the video communication session. Indeed, terminals 105, 110 can communicatively couple to the video communication server 125 and the video communication session can be facilitated over the video communication server 125. Further, in some implementations, functionality permitting terminals to locate or otherwise identify other terminals for a video call, functionality controlling the initiation and termination of a session, functionality permitting previewing of video call data by at least one of the participants, and other functionality can be provided using video communication server 125. Terminals 105, 110 participating in or attempting to participate in a video call session served by video communication server 125, can communicate with video communication server 125 over one or more networks 130.

Terminals 105, 110 configured for participation in a video communication session, such as a video conference, video call, or other communication, can include devices, software, and other logic and functionality permitting the terminal to capture and display video data for sharing within video communication sessions. For instance, each terminal 105, 110 can include one or more camera devices (e.g., 135, 140) for capturing video data in connection with a video communication session. The resolution, frame rate, and video format capable of being captured by the camera devices 135, 140 can vary consistent with the mode and specifications of the terminal and/or video communication service used. In some instances, video data captured by the camera can be converted (for instance, by video communication server 125 or the terminal itself) from a native or first format to another format more amenable for use within a particular video communication session. Such cameras can be integrated into the terminal, be connected to the terminal as a peripheral device, or be otherwise associated with the terminal.

Further, terminals 105, 110 can also include video display devices (e.g., 145, 150), such as a monitor, television, screen, Telepresence™ system display, or any other element capable of rendering video data for presentation to human users during a video conference. In some instances, video communication sessions can also permit the sharing of video data, or synchronization with a corresponding audio or telephonic communication session, allowing users to exchange both video and audio data and thereby communicate verbally and through non-verbal physical cues (e.g., facial expressions) with other video session participants. In accordance with such implementations, terminal devices 105, 110 can further include microphone devices for capturing audio data from the human participant as well as speaker devices for presenting audio data captured from other participants in the communication session.

In some instances, combinations of video display devices (e.g., 145, 150), camera devices (e.g., 135, 140), and other components, such as microphones, speakers, network interfaces, software modules, etc. used to join and participate in video communication sessions can be integrated within a single video communication terminal device together, such as a personal, laptop, or tablet computer, smartphone, Telepresence™ systems, etc. with integrated display device, microphone, camera, etc. In some instances, some of the devices used at the terminal in connection with a video communication session can be external or peripheral to other devices used by the terminal, such as a camera or microphone peripheral, external monitor (such as a television), among other examples. In each instance, a terminal can allow for the capture, presentation, and communication of video call data within a video communication session.

The components of communication system 100 may use specialized applications and hardware to create a system that can leverage a network. For instance, communication system 100 can use Internet protocol (IP) technology and can run on an integrated voice, video, and data network. In some instances, communication system 100 can leverage IP technology while providing data security and privacy through the use of virtual network connections between components of communication system 100. The system can also support high quality, real-time voice, and video communications using broadband connections. It can further offer capabilities for ensuring quality of service (QoS), security, reliability, and high availability for high-bandwidth video communication session connections.

As a general proposition, the video communication technology of communication system 100 can be configured to simulate an in-person meeting experience for its participants. In some settings, video communication technology can be used within business or governmental settings to facilitate a meeting over a video conference. Participants in such meetings may be acting primarily as representatives of their respective companies, within an office setting, and may be less concerned with the potential for invasions of personal privacy within such business-oriented conferences. As multi-party video communications expand into the private domain however, it is anticipated that users may tend to be more concerned with and guarded against intrusions or violations of their personal space during video calls. Unlike audio telephone conversations, a video call can potentially display, to the other participants on the call, the participant's face, clothing, location, and surroundings, including background images of the caller's home, children, pets, and possessions. While visual exposure of such personal characteristics to others may be tolerated or even desired when the caller is participating in a video call with friends, family, or other participants with which the caller has a trusted relationship, such exposure can be very undesirable, and even threatening, if the caller does not trust or wishes to avoid video calls with other particular or unknown callers.

Further, as video calling increases in popularity and deployment, it may be anticipated that various abuses and unwelcome uses of video will emerge, such as video-based telemarketing, video stalking, video prank calling, etc. In some instances, a user may wish to avoid or prepare for certain video calls. For instance, a video call participant, in addition to worrying about how their voice sounds over the call, may also worry about their physical appearance within the video call. For instance, a participant may feel comfortable participating in video calls with close friends and family while casually dressed, but desire to be more formally attired for video calls with others. Further, in certain instances, a participant receiving a video call (or being invited to join a video communication session) can desire to screen the source of an incoming call or video communication request. In some instances, a user can be presented with a name, telephone number, or other identifier in connection with a particular incoming video call or video communication invitation. Such identifiers, however, can be readily forged, manipulated, and falsified using existing technology to misrepresent the true source of an incoming call, making potential video call participants susceptible to nefarious, misleading, and other undesired virtual communication sessions.

In accordance with the teachings of the present disclosure, communication system 100 can be configured to overcome these shortcomings (and others) in providing a visual preview of other potential participants in a video communication session. For instance, after a first participant in a video call, or other video communication session, has initiated the call and attempted to have another participant join the call, video images can be captured and sent from the calling terminal for viewing on the called or invited terminal to allow users of the called terminal to visually identify the caller.

Further, such preview images can be presented to the called user before the called terminal formally joins the session and begins transmitting video data of its own to the calling terminal and other terminals potentially already participating in the video communication session. In such instances, the called user can peek into the video communication session to assess whether the called user would like to or feels safe joining the call, all while withholding video data of the called user from the other potential participants. Further, the called user can view such preview video data without the caller being notified that the called user is screening the video call and viewing video data captured from the caller(s).

For instance, the terminal receiving the call can present a ring tone to the user indicating an incoming video call. Before the call is answered, the user can select to perform a peek to capture and view preview images of the caller. The receiving system can present the incoming video with no indication of the preview on the calling terminal's side. If the user decides to answer the call, the terminal receiving the call can fully join the communication session to begin transmitting video call data to other participants on the call.

Figure 2A:
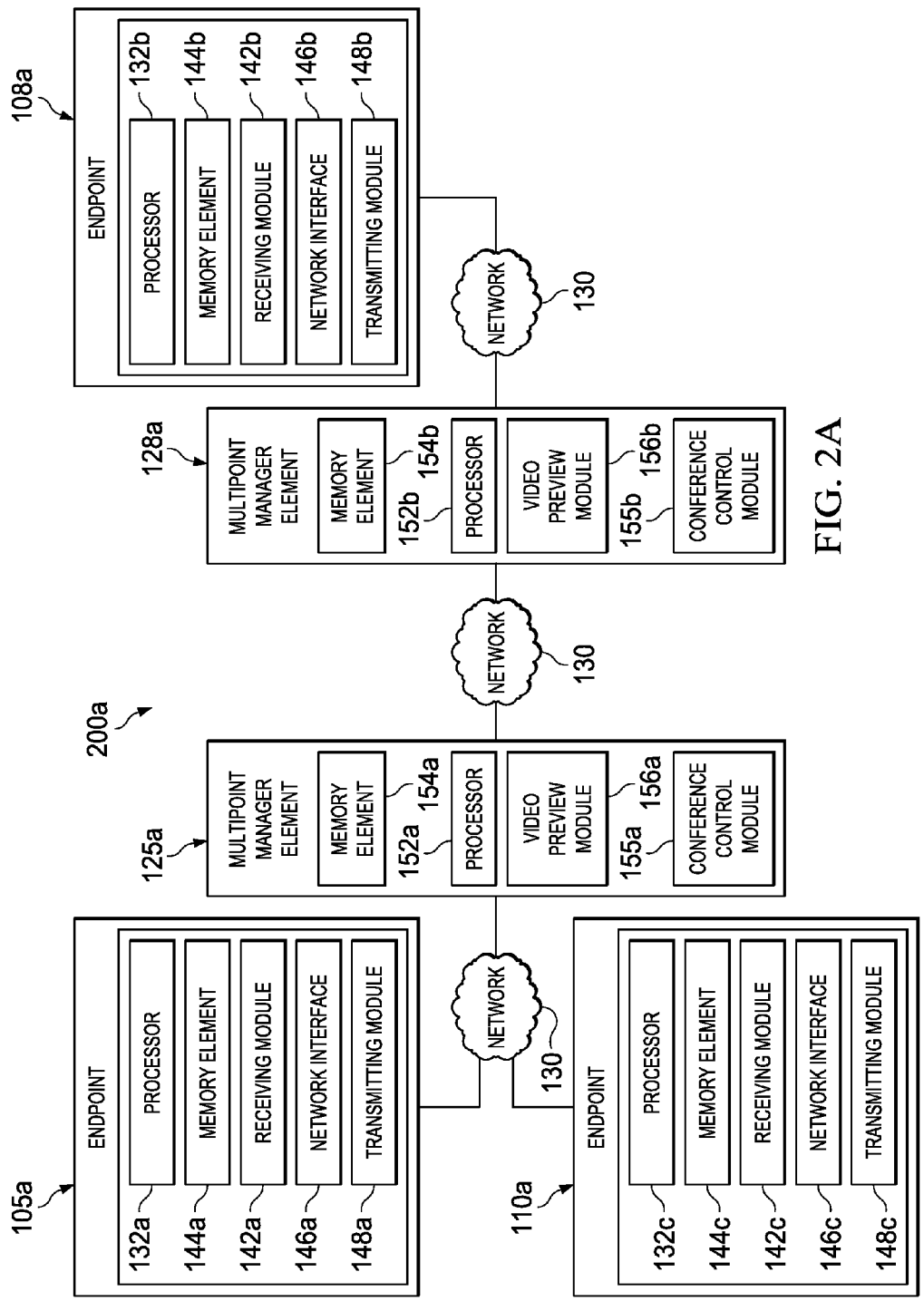
FIG. 2A is a simplified block diagram of a first example communication system enabling video previewing within a conferencing environment in accordance with one embodiment of the present disclosure.
Figure 2B:
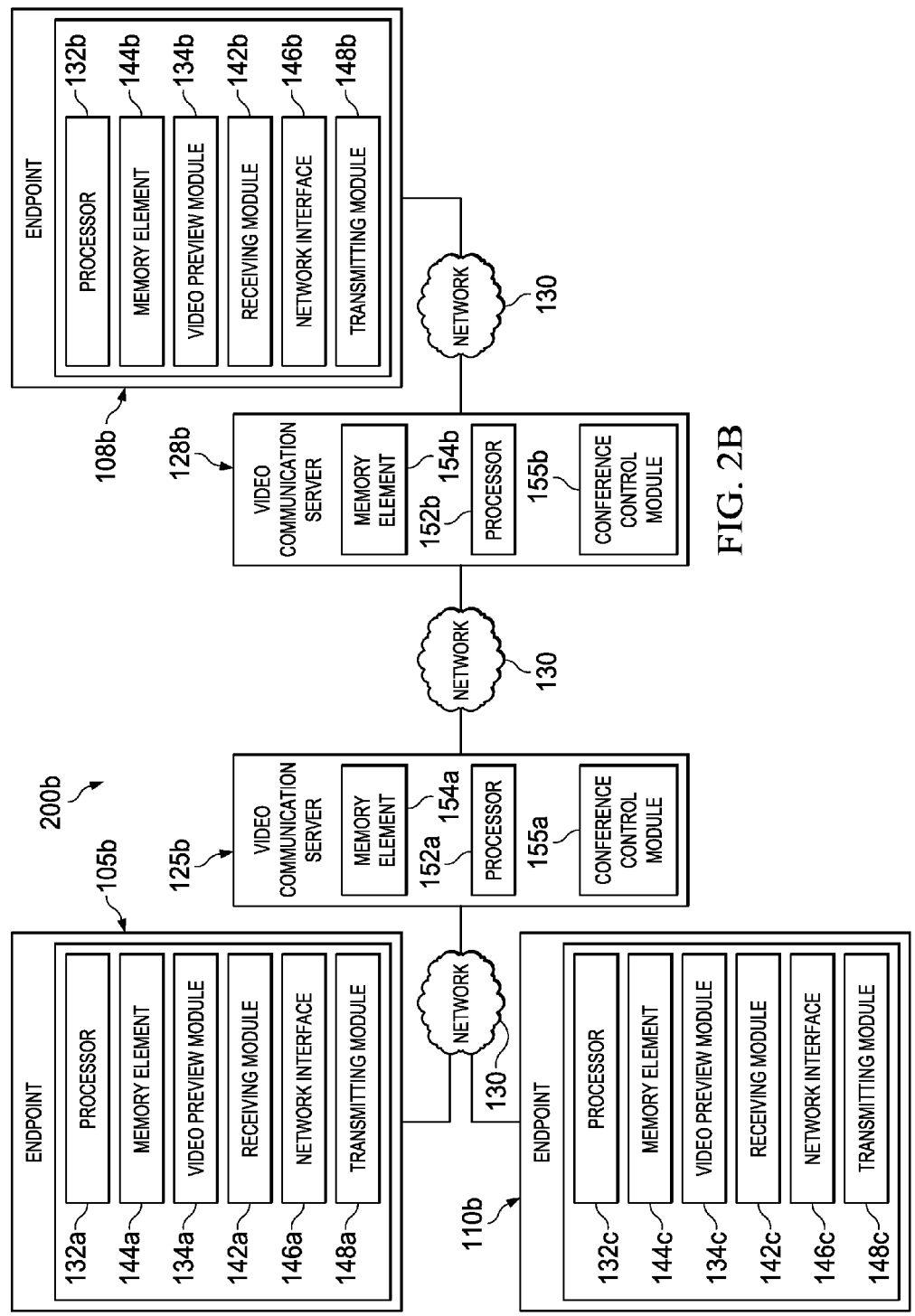
FIG. 2B is a simplified block diagram of a second example communication system enabling video previewing within a conferencing environment in accordance with another embodiment of the present disclosure.

Turning to FIGS. 2A-2B, simplified block diagrams 200a, 200b are shown illustrating possible details associated with communication system 100. In each of the examples of FIGS. 2A and 2B, example communication systems are shown including video communication terminal endpoints 105a-b, 108a-b, 110a-b configured to participate in video communication sessions offered using video communication servers 125a, 128a. Each terminal endpoint 105a-b, 108a-b, 110a-b can include one or more processors (e.g., 132a, 132b, 132c) and one or more memory elements (144a, 144b, 144c). Further, terminals 105a-b, 108a-b, 110a-b can further include various other components and software-based modules for use in connecting to and facilitating participation in a video communication session. For instance, terminals 105a-b, 108a-b, 110a-b can further include a respective video preview module 134a, 134b, 134c, respective network interfaces 146a, 146b, 146c, respective transmitting modules 148a, 148b, 148c, and respective receiving modules 142a, 142b, 142c. Additional modules and components can also be included, and modules and components shown and/or described can be combined and consolidated or divided into fewer or more components respectively.

In general, terminals 105a-b, 108a-b, 110a-b can include network interfaces 146a, 146b, 146c configured for use in connecting the terminals 105a-b, 108a-b, 110a-b to one or more network elements to communicate and receive data in connection with a video communication session. Indeed, a transmitting module 148a, 148b, 148c can be used to collect and send video call data collected at the terminal for sharing with other participating terminals in a video communication session. Further, receiving modules 142a, 142b, 142c can be used to receive and prepare for rendering video call data collected at and received from other participating terminals in a video communication session.

Note that the term 'endpoint' is a broad term that encompassed terminals 105a-b, 108a-b, 110a-b and, further, can also include devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, or any other device, component, element, or object capable of initiating, joining, or otherwise participating in voice, audio, or data exchanges within communication system 100. Endpoint terminals 105a-b, 108a-b, 110a-b can further provide a user interface and input devices for use by an end user within a video or multimedia communication session, such as a microphone, a display, a keyboard, touchpad, mouse, cameras, or other terminal equipment.

Video communication servers 125a-b, 128a-b can be configured to establish, maintain, and otherwise manage a video session between one or more terminal devices 105a-b, 108a-b, 110a-b utilized by end users who may be, in some instances, located in various remote sites and locations. Video communication servers 125a-b, 128a-b can include respective processors 152a, 152b, respective memory elements 154a, 154b, and respective conference control modules 155a, 155b, which can be used, among other functions, to control what images, user interface elements, video, and sound are exchanged, rendered, and presented on a given terminal display for end users during a video session. In general, video communication servers 125a-b, 128a-b may communicate with endpoints (e.g., 105a-b, 108a-b, 110a-b) through any suitable standard or proprietary communication or conference control protocol. In some instances, a video communication server (e.g., 125a-b, 128a-b) can further include a switching component that determines which signals are to be routed to individual endpoints (e.g., 105a-b, 108a-b, 110a-b).

Video communication servers (e.g., 125a-b, 128a-b) can also determine how individual end users are seen by others involved in the video conference based on control elements, preset either by a video communication service provider or individual user, or dynamically specified by participants during a video communication session. Additionally, video communication servers (e.g., 125a-b, 128a-b) can control the timing and coordination of video communication session activities, including the presentation of video call data on various terminal endpoints participating in the session. Video communication servers 125a-b, 128a-b can also coordinate and control video communication services and sessions according to particular policies, including user-specific and endpoint-specific policies that can be used, among other objectives, to customize or otherwise tailor functions, user interfaces, and rights of an endpoint or user within a video communication session. For instance, in some examples, the ability to screen video calls through a video preview of the caller can be offered in accordance with a policy subscribed or agreed to by a particular user.

Video communication sessions can make use of a variety of different computing networks and network configurations. For instance, network 130 can represent a series of points or nodes of interconnected communication paths for receiving and transmitting packets of information propagating between components in communication system 100. Network 130 can offers a communicative interface between the endpoint terminals and other network elements (e.g., video communication server 125*a-b*, 128*a-b*), and can be or include any local area network (LAN), intranet, extranet, wireless local area network (WLAN), metropolitan area network (MAN), wide area network (WAN), virtual private network (VPN), the Internet, or any other appropriate architecture or system that facilitates communications in a network environment. In some instances, network 130 can implement a UDP/IP connection and use a TCP/IP communication protocol in particular embodiments of the present disclosure. In other instances, network 130 can implement other suitable communication protocols for transmitting and receiving data packets within communication system 100.

Turning to the particular example shown in FIG. 2A, in addition to conference control modules 155*a*, 155*b*, video conference servers 125*a*, 125*b* can further include a video preview module (e.g., 156*a*, 156*b*) configured to facilitate previewing of video data from an incoming call. The video preview module 156*a*, 156*b* can assist users receiving the call in identifying the source of the incoming call thereby assisting the user in determining whether the call should be answered or ignored. For instance, in one particular example, video preview module 156*a*, 156*b* can identify a request or attempt by one terminal (e.g., 105*a*) to initiate a video call, video chat, or other video communication session, with another terminal (e.g., 110*a*). The video preview module 156*a*, 156*b* can identify that video previewing is enabled for the other terminal 110*a* and capture video data captured at the first terminal (e.g., 105*a*) while the user of the first terminal waits for the called terminal to pick-up and join the video session. Unbeknownst to the user of the first terminal (e.g., 105*a*) captured video data can be provided to endpoint 110*a* for presentation on a display device of endpoint terminal 110*a*, allowing the user of terminal 110*a* to preview or screen the visual identity of the caller and determine whether the user will agree to participate in the video session. Further, video preview module 156*a*, 156*b*, in some implementations, can provide further functionality including processing of a user's request to either ignore or join the video session in response to a received video preview, as well as perform particular actions (e.g., automatically blocking or warning the user of subsequent calls from the same source, etc.) based on a user's previous response(s) to a preview.

As shown in the example of FIG. 2B, video previewing functionality can also be realized, at least in part, at the endpoint terminal itself. For instance, in the example of FIG. 2B, each of endpoint terminals 105*b*, 108*b*, 110*b* further include a video preview module 134*a*, 134*b*, 135*c* configured to facilitate the previewing of video data captured from a calling terminal prior to the called terminal joining the session and transmitting video data. In some instances, functionality for facilitating previewing of video data for use in screening incoming video calls, can be provided by modules (e.g., 134*a*, 134*b*, 135*c*, 156*a*, 156*b*) operating cooperatively at each of the endpoint terminal and video communication server.

It is to be understood that the examples shown and described in FIGS. 2A-2B are simplified, non-limiting examples, presented solely to generally illustrate certain concepts, features, and examples. It should be further understood that while the examples of FIGS. 2A-2B show multiple video communication servers 125*a-b*, 128*a-b*, in some implementations, a single video communication server can be provided, in communication with two or more terminals in a communication session and facilitating video session management functions and video previewing functionality similar to that described above. Additionally, while in some instances, video communication servers can be located remotely from video terminals and serve video session management functions to a plurality of different video terminals, in other instances, video communication servers can be implemented, in whole or in part, locally at one or more video terminals, and can, in some instances, be dedicated to managing, joining, and provisioning video communication sessions for one or more particular video terminals, among other implementations.

Figure 3B:
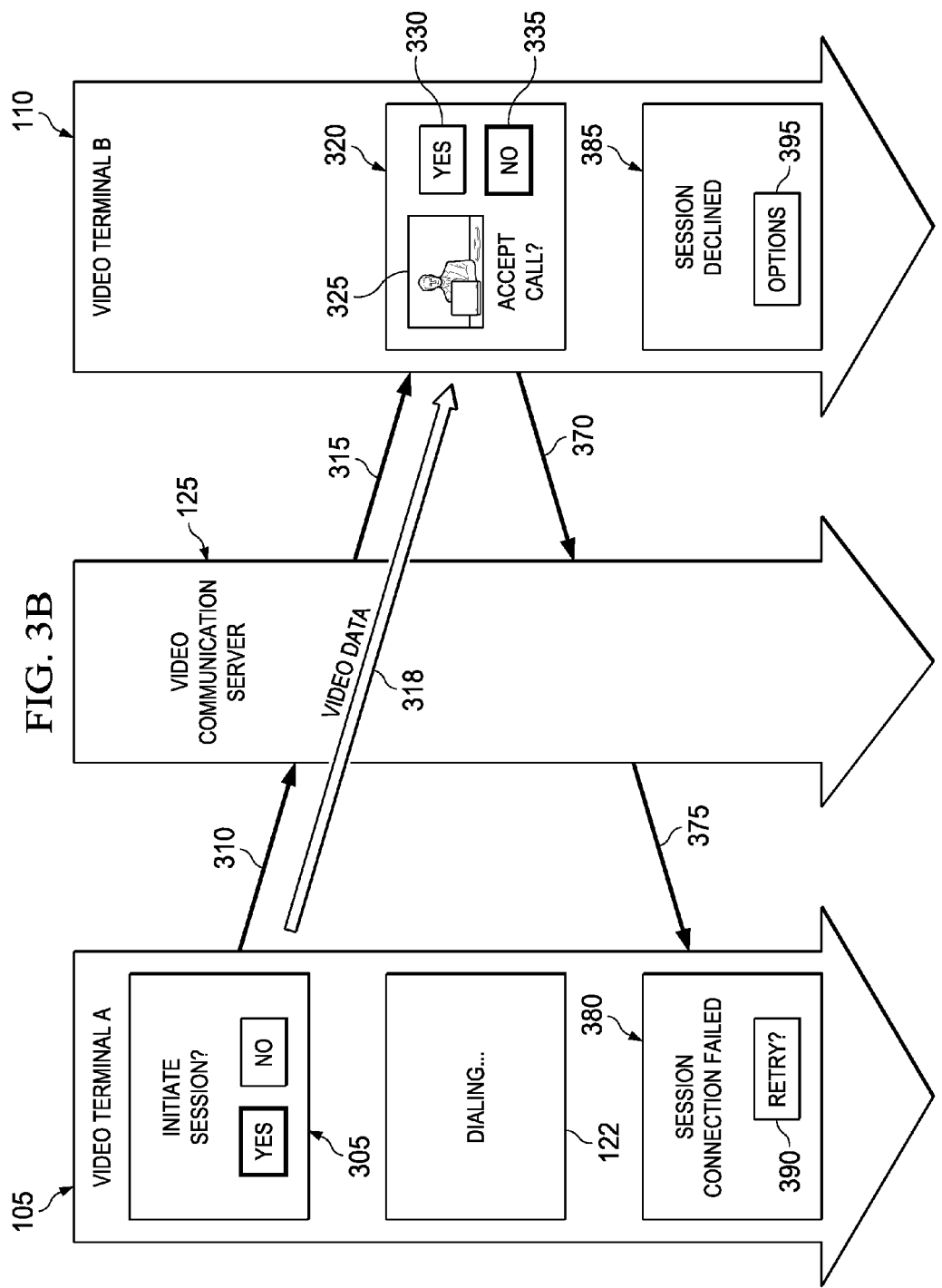

Turning to FIGS. 3A-3B, example representations are shown illustrating example attempts to initiate video communication sessions in a system including two or more video terminals (e.g., 105, 110) and one or more video communication servers (e.g., 125). In one example, a first user of video terminal 105, attempts to engage another user, at terminal 110, in a video communication sessions, such as a video call, video chat, video conference, or some other video communications session. A user interface 305 (illustrated in very simplified form in the representations of FIGS. 3A-3B) can be presented to the first user to assist the user in establishing a video communication session with one or more other terminals. For instance, an example user interface 305 can include user interface (UI) elements allowing a user to specify the identity of the user and/or terminal to be called or invited to the video communication session, as well as UI controls for confirming and initiating the call, defining particular policies, specifications, and settings for the video communication session, etc. Upon initiating or attempting to initiate a video communication session with video terminal 110, data 310 can be sent to a video communication server 125 managing the requested video communication session, such as a server or system providing video communication services to one or more different video terminals in a system.

Upon receiving the first terminal's 105 attempt to initiate a communication session with second terminal 110, video communication server 125 can, in some examples, prepare data 315 for use in communicating the request to the second terminal 125, awakening and configuring the second terminal for participation in video communication sessions, among other purposes and functions. For instance, in some examples, video communication server 125 can provide the second video terminal 110 with the opportunity to preview video data 318 captured or received by video communication server 125 prior to the second terminal 110 joining the initiated session.

The initial video data 318 obtained from the calling terminal (e.g., 105) can be obtained using a variety of different techniques, some techniques used or based, at least in part, according to the particular architecture or protocol applied in establishing the communication session with the participating terminals. For example, in some instances, video data 318 can begin being transmitted by video terminal immediately upon sending a video session initiation request (e.g., 310). In another example, after a video session initiation request (e.g., 310) is sent by terminal 105 and received by the video communication server 125, video communication server 125 can indicate that a session has been initiated and request that video data 318 begin being transmitted from terminal 105, terminating the session if an error or issue occurs in joining the called terminal (e.g., 110) to the session.

In still another example, in connection with initiating a video session requested by terminal A, video communication server 125 can request that a video data sample be transmitted from terminal A in connection with the authorization, acceptance, or optimization of the terminal's 105 video data configuration for use within video sessions hosted or managed using video communication server 125. In yet another example, in response to requesting the initiation of a video session, video terminal 105 can establish an interface, such as an API or other interface, with video communication server 125 that allows video communication server to access, and in some instances, even control operation of video collecting mechanisms at the terminal 105, allowing the video communication server to capture, in some cases covertly, video data directly from the terminal 105.

Preliminary video data 318 captured from cameras operating at terminal 105 prior to the called terminal 110 joining the video session can be shared with terminal 110 as preview data, prior to terminal 110 joining the session. For instance, upon receiving a video call or invitation to join a video communication session, a user interface 320 can be presented at terminal 110 that includes at least a portion of the video data 318 captured at terminal 105. The video data 318 can include images of the caller(s) themselves, the location or setting of the caller, and other visual characteristics of the incoming call to assist the user of the receiving terminal 110 in identifying the source, context, or conditions of the call. In the simplified representation of user interface 320 shown in FIG. 3A, a window 325 can be displayed that includes at least a portion of the captured video data 318. In some instances, video data 318 can also include audio data captured at terminal 105, the captured audio data being presented along with captured video data in connection with user interface 320 at terminal 110. Further, other data can also be presented at terminal 110 in addition to preview video (e.g., 325), such as an identification of the source of the call, including an affiliated telephone number or user ID associated with the calling terminal 105, detected geographical location of the call, etc., to thereby provide additional context to the user of the receiving terminal 110. Additionally, UI controls, such as controls 330, 335, can also be provided, allowing the user of terminal 110 to provide feedback in response to the received preview data.

For instance, UI controls 330, 335 can allow a user of terminal 110 to indicate whether the user wants to accept or deny the video call. Other UI controls can also be provided, including controls for directing how the preview data is displayed (e.g., how long the preview video data should be presented, the portion of the user interface the preview video window 325 should occupy, whether to replay the captured preview video data, etc.), controls for displaying additional data relating to the calling terminal available to either the receiving terminal or video communication server 125, among other example UI controls.

In some example implementations, three or more terminals can participate in a video communication session, such as a video conference call, multi-way video chat session, multi-way video call, etc. In some instances, multiple terminals may have already joined or have been invited to join a particular video call or session to which a receiving terminal 110 has been invited. Accordingly, in such implementations, preview video data can include preview data collected from two or more different terminals other than the receiving terminal. As in the example of a potential two-party call, a receiving terminal (e.g., 110) receiving an invitation to join a multi-party (e.g., three parties or more) video session may similarly be interested in knowing the number of parties involved in a video session as well as the identities of those parties. For instance, while a user may be comfortable with one or more of the parties involved or invited to a multi-party call, including a primary party or host of the session, the user may not be familiar with or trust other parties involved in the call. Accordingly, as in the two-party example shown in FIG. 3A, preview data can be collected from a plurality of video terminals and sent to one or more receiving terminals invited to participate in connection with a preview of the participants involved in the session. For instance, a split screen view can be presented in window 325, showing collected preview video data from a plurality of participant terminals in a multi-party session. In some instances, some participants in the multi-party session may be invited and not yet transmitting video data within a fully established session. Still, in some examples, preliminary video data can be captured of participants invited to a multi-party session, including from terminals that have been invited but have not yet accepted and formally joined the video session, among other examples.

Preview video data presented to a user in connection with the screening of an incoming video call or video communication session invitation, can take many forms and formats. For instance, a single still image can be captured from captured video data 318 and presented to the user of terminal 110 in a user interface (e.g., 320) providing the preview to the user. In other instances, a selected portion of collected video data 318 can be presented as video in user interface 320. Select portions of a collected video data 318, whether a video segment or still image, can be automatically selected based on an identified relevance of the video portion. For instance, a caller may temporarily exit the video frame while waiting for the called terminal to join, making some preview video less effective in alerting the called end user of the identity of the caller. Accordingly, in order to maximize the chance that presented preview data is useful to the end user of the called terminal, select portions can be selected, for instance, based on facial recognition processing, identifying the presence of a human face within frames of the collected video data 318, identification of human voice directed to a microphone in proximity to the camera collecting video data 318 (increasing the probability that the caller's face is within view of the calling terminal's 105 camera), among other examples. In some implementations, live video data 318 collected from the calling terminal 105 can be displayed in a streaming or substantially live fashion on video terminal 110, for instance, based on the assumption that as the call grows closer to connecting, the caller is most likely to be in position (i.e., in front of terminal's 105 camera) for the start of the call. In other instances, both a live feed of terminal 105 and selected video segment can be presented (e.g., in split-screen view) to the user of the called terminal as preview video data. In additional implementations, the user of the called terminal can be presented with UI controls and corresponding functionality for replaying, slow-playing, freezing, and zoomed-in viewing of the preview data, to assist the user in analyzing the preview video data, among other examples.

In some instances, the presentation of preview video data at the receiving terminal 110 can be optional or based on particular conditions. In some instances, a user may not wish to bother with additional previewing steps in connection with joining a video session with an expected or recognized caller. For instance, other data, such as traditional caller ID data (i.e., a name and phone number associated with a particular telephonic endpoint) associated with the calling terminal 105 can be displayed at the receiving terminal 110 along with UI controls that permit the user to elect to have preview video data collected and/or displayed from the calling terminal 105 (e.g., when the user of terminal 110 does not immediately recognize the identity of the calling terminal 105 from other data or cues initially available to the user). For instance, a user of the receiving terminal can be presented with an option to launch user interface 320 in response to receiving a video call or other invitation to join a video communication session, allowing the user to optionally view preview data collected at the calling terminal 105, among other examples.

Additionally, presentation of preview video data, such as in user interface 320, can be conditioned upon certain criteria, events, or other aspects. For example, availability of video previewing features, such as described herein, can be offered as a paid subscription service, and presentation of user interface 320 and preview video data can be conditioned on the terminal 110, or a user account associated with the terminal, being authorized to consume this service and feature. In other instances, video previewing and call screening can be conditioned on the identification, by the terminal 110 and/or video communication server 125, that a particular video call or session originates from an unknown or otherwise unfamiliar caller. For instance, a listing of favorite, trusted, whitelisted, or otherwise known callers and terminals can be maintained by the terminal 110 (or by video communication server 125 on behalf of terminal 110 and other terminals), so that video sessions initiated by such callers and terminals do not automatically trigger video screening of the call. Accordingly, calls from unknown, unfamiliar, or untrusted sources can, in some instances, automatically trigger the launch of video previewing of a call (e.g., using user interface 320). Other factors and data can also be considered to intelligently drive when and how (e.g., automatically or optionally) video previewing is launched by the terminal 110 and/or video communication server 125, including the time of day the call arrives, the geographic source of the call, whether the call originates from an outside video communication service or out-of-network caller, etc., among other considerations.

Continuing with the example of FIG. 3A, following the presentation of preview video data 318, a user at terminal 110 can indicate whether the user wishes to accept the call, thereby resulting in data 350 being sent indicating whether the user of terminal 110 accepts the call or not. In the example of FIG. 3A, data 350 indicates that the user of terminal 110 has agreed to accept the video call from terminal 105, and a video communication session is established between terminals 105 and 100, with video call data 355 being exchanged by both terminals 105, 110 within the session.

It should be noted that, in this example, prior to receiving a user's response to preview video data (i.e., indicating whether a video call will be accepted or not), video data collected at terminal 110 is not shared with the calling terminal 105, thereby preserving the privacy and concealing the intentions and availability of the user of terminal 110 from the user of terminal 110. However, once authorization is received (e.g., at 350), video data is collected from terminal 110 and shared with the calling terminal 105 as is typical in video-enabled communication sessions. Accordingly, video data showing the user of the called terminal 110 is displayed 360 at the calling terminal 105, while video showing the user of the calling terminal 105 is displayed 365 at the called terminal 110.

While in the example of FIG. 3A, a user of the called terminal (e.g., 110) elected to join a video session after receiving and evaluating received preview video data, in some instances, the user may elect not to join the session, based, for instance, on an evaluation of the received preview data. In instances where preview video data has been presented to the user of the called terminal (e.g., 110), and the user of the called terminal has elected not to join the video communication session, data 370 communicating the user's decision can be collected at a user interface (e.g., 320) of the called terminal and sent to video communication server 125.

Based on the response data 370, video communication server can act to communicate that the called terminal did not join the video session while, in some instances, hiding the fact that a video preview of data collected from calling terminal 105 was presented at terminal 110 potentially causing the called terminal 110 not to join the call. Tactfully handling a denial to join a call by a called terminal can be important from a user experience perspective, as the user of the called terminal may want to guard against potentially offending the denied caller (e.g., when the user intends to call-back the denied caller at a more convenient time, etc.).

For instance, data 375 can be prepared by video communication server 125 to generically communicate that the video communication server 125 failed to establish a session with the called terminal 110. In some instances, data 375 can communicate the failure to establish a session while remaining silent regarding the presentation of collected preview data 318 at the called terminal 110. Indeed, in some instances, data 375 received at the calling terminal 105 can be rendered by calling terminal to cause a user interface 380 to be displayed to the caller that intimates that the failure to connect to the called terminal 110 was technical in nature (e.g., as a result of a network error, failure of the called terminal 110 to respond, etc.). Accordingly, user interface 380 can include an option to allow the caller to retry connecting to the originally called video terminal 110 (e.g., using UI control 390).

Upon declining a video session invitation or video call, the called terminal 110 can also present one or more user interfaces 385 to the called user providing the user with options for performing actions pertaining to the user's decision to deny (or even accept) a received video session invitation. For instance, a user, in connection with denying or accepting a video call from a particular terminal device or user associated with the terminal (e.g., through an associated user account), can elect to blacklist or whitelist the caller so as to automatically deny or block future calls in the case of a blacklist or automatically connect to futures calls from callers included in a whitelist. In some instances, data can be captured from the preview video data for use in identifying, from future received video data, that a blacklisted (or whitelisted) caller is attempting to contact the terminal or user associated with the blacklist.

In some instances, a particular person can attempt to contact a user or terminal using a variety of user accounts, aliases, and terminal devices. Rather than blocking future calls from a blacklisted caller (or automatically joining calls from a whitelisted caller) characteristics of subsequent video data can be analyzed for similarities with previously collected preview video data associated with a user's decision to blacklist (or whitelist) a particular caller or party. For instance, face data can be captured from the preview video data, associated with the blacklisted caller, and stored as reference data to identify the blacklisted caller in future video communication sessions, for instance, based on facial recognition analysis of the future video stream (such as in future preview video data).

Other implementations can capture reference data corresponding to unique background features included in preview video data (e.g., presented in connection with a blacklisting (or whitelisting) of a particular user, such as the layout of a room, architectural features, furniture, and other elements, including signage and multi-media data presented within a frame of preview video data associated with a blacklisted user). Such features can also be identified in connection with future video sessions, including preview video data sent to a receiving terminal in connection with an invitation to the future video session, and compared against stored reference data in order to identify a repeat blacklisted (or whitelisted) caller.

In some implementations, a user of a called terminal, upon reviewing preview video data collected at a calling terminal, can elect, via UI controls presented in a user interface (e.g., 320, 385) of the called terminal, to launch a report, for instance, of a terms of use violation or illegal act observed by the user in the presented preview video data. Further, the preview video data can be saved or stored and associated with the identified caller as evidence of the reported violation, the preview video data being stored locally at the called, reporting terminal or in memory of a remote video communications server 125, etc.

In some instances, a user, rather than outright rejecting an invitation to join a video session, can elect to only partially join the video session without transmitting video data from the called terminal (e.g., 110). For instance, in response to viewing preview video data, a user of the called terminal 110 can elect to partially join a video communication session so as only to allow voice data (and not video data) to be collected for presentation to other participants in the video session. In some instances, such an election can cause a communication (e.g., using data 375) to the calling terminal and other participating terminals that only audio data is able to be presented within the particular session, thereby hiding the reality that the called user has elected that video data not be shared with the other participants, for example, because the called user has determined that they are uncomfortable with sharing video data with the other participant(s) based on preview video data collected from the other participant(s). In other implementations, such as in a video conference environment, the called user can partially join the meeting so as to "lurk" in the session, consuming video (and audio) data transmitted from other participants while hiding the user's participation in the meeting from one or more other users and withholding video data from being shared within the session.

It should be noted, that while the examples illustrated in FIGS. 3A-3B, show that terminal 110 is the receiving or called terminal in a video communication session and terminal 105 is the calling or initiating terminal in the video communication session, in other examples, the roles of the respective terminals can be reversed. Terminals can both send and receive requests to join a video session, and any terminal in a network of terminals can be permitted to initiate a new video session. Further, in some instances, terminals can both screen incoming video calls from other terminals (e.g., via preview video data) as well as be screened by other terminals. For instance, terminal 110, in an alternate example, could initiate a call with video terminal 105 prompting video terminal 105 to screen, via preview video data collected from terminal 110, the caller of terminal 110 to assist the user of terminal 105 in decided whether to join the session launched by terminal 110. As in other examples described above, when screening collected preview video data, video data from the screening terminal 105 may be withheld from the screened terminal and the screened terminal may be unaware that video data collected from the screened terminal is being screened or previewed by the screening terminal 105.

Turning to FIG. 4A, a simplified flowchart 400*a* is shown of an example technique for previewing an incoming video communication session invitation. A request to join a video communication session can be identified at 405. The request can take the form of an incoming video call, incoming video chat request, invitation to join a video conference, and other requests to join video communication sessions. Identifying such a request can include, among other examples, a video communication server receiving a request from a first terminal to facilitate a video session between the first terminal and one or more other terminals. Identifying a request for a called terminal to join a video communication session can also include the calling terminal receiving an invitation or other request to join the video communication session, either from a video communication server facilitating the session or from the calling terminal directly, among other examples.

Upon identifying the incoming request, video data captured at the first terminal requesting or originating the session, or other terminals also included in or invited to the session (i.e., preview video data), can be allowed (at 410) to be presented at a second, called terminal before the second terminal joins the session and shares video data with other terminals that are to be included in the session. Allowing such preview video data to be presented at the second, called terminal can include capturing video data from the other participant terminals, selecting video data from the captured video data for inclusion in the preview video data, and sending at least a portion of the captured video data to the second, called terminal for presentation in a user interface of the second terminal.

One or more video communication servers or other devices and modules can be used to capture and forward preview video data to a terminal. In some instances, the second terminal can, for instance, via an API to the calling terminal or a meeting or video chat client installed on the calling terminal, capture preview video data from the calling terminal and have the captured data forwarded directly to the called terminal. In some instances, video data from a calling or participating terminal can be collected and/or previewed at the other receiving or called terminal without the user of the calling or participating terminals knowing that such data has been shared with the called terminal prior to the video session formally beginning.

Turning now to FIG. 4B, another simplified flowchart 400*b* is shown of an example technique for acting on received preview video data. In response to presented preview video data on a called terminal, a request (e.g., via user input) can be received at 420: indicating that one or more callers to whom the preview video data applied should be included in one or more particular categories. For instance, a user can assign varying preferences, profiles, and permissions to particular callers. As examples, a user can designate that certain callers be whitelisted or blacklisted. Some callers can be categorized as friends and family, others categorized as business relationships, while still others categorized as solicitors, among potentially countless other categories. A set of characteristics of the caller can be determined at 425 from the preview video data. For instance, facial recognition can be performed on the preview video data to identify face data corresponding to one or more callers. The face data can be stored, for example, in a database or other data store, either locally or remotely, and associated with the particular caller. Associating characteristics with a caller can include associating the characteristics (such as face data, a telephone number, video calling service, terminal, etc.) with a particular user or account ID, terminal identifier, or other identifier associated with the caller or terminal from which the caller attempted to reach the called party.

Future requests to have a terminal join a video communication session can be identified at 430. Data included or associated with the request can be analyzed (such as video preview data, location information, or a telephone number corresponding to the future request, among other examples) to identify at 435 that at least one characteristic in the set of previously-identified characteristics is included in, or otherwise also associated with the identified future request. For instance, facial recognition can be performed on preview video data or other video data collected in connection with the future request to determine at 440, based on corresponding stored face data, that the first caller is also involved in, or the source, of the subsequent request. The identity of subsequent callers can thus be automatically determined, based on feedback received and data collected in connection with video session previews corresponding to earlier video communication sessions and attempts.

Further, based on a user's request to categorize a particular caller, automatic identification (e.g., at 440) of the caller in connection with subsequent video sessions can trigger automated responses to the caller's subsequent calls. For instance, a blacklisted caller can be automatically identified and blocked, saving the called user from having to re-assess calls from such unwanted callers. Further, a called user can be alerted to particular calls based on the identity and/or category of the caller. As an example, video session requests from callers determined to have a particular identity, and thus included within a particular category, can cause the called terminal to provide certain alerts to the user (such as different ringtones or graphical displays) based on the caller's determined identity or corresponding categories.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, (i.e., one or more modules of computer program instructions, encoded on computer storage medium for execution by, or to control the operation of, a data processing apparatus). Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

In more general terms, video communication server 125 is a network element that can be provisioned in virtually any communications architecture, system, network, etc. Moreover, such a network element (i.e., video communication server 125) has considerable breadth and, therefore, necessarily encompasses various types of routers, switches, gateways, bridges, loadbalancers, firewalls, servers, inline service nodes, proxies, processors, modules, nodes, or any other suitable device, component, element, or object operable to exchange information in a network environment. The network element may include appropriate processors, memory elements, hardware and/or software to support (or otherwise execute) the activities associated with using a processor for screen management functionalities, as outlined herein. This includes the memory elements being able to store code (e.g., software, logic, processor instructions, etc.), that can be executed to carry out the activities described herein. Moreover, the network element may include any suitable components, modules, interfaces, or objects that facilitate the operations discussed herein with reference to managing video data. This may be inclusive of appropriate algorithms and communication protocols that allow for the effective exchange of data or information in the network.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment that could benefit from such technology. Virtually any configuration that seeks to intelligently offer a preview of video data (or of individuals) could enjoy the benefits of the present disclosure. The can readily include Skype™ applications, web cam architectures, WebEx™ platforms, MeetingPlace™ platforms, Google Chat™, or any other architecture or platform configured for exchanging data.

In addition, it should be noted that certain users may have their video data blocked such that some of the objectives discussed herein may be frustrated. For example, some endpoints may include privacy settings (or service provider settings) that preclude caller ID from being viewed. This may include indicators that display 'private' for inbound calls associated with an originating caller. A similar paradigm can be deployed in the context of the present disclosure, where a user may have provisioned privacy setting for which an attempt to retrieve video data may not be possible. In such instances, a simple message can be sent to the counterparty to relay that this video data cannot be displayed prior to a second endpoint electing to join a video communication session.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   identifying a request, from a first endpoint, for a second endpoint to join a video communication session between the first endpoint and a third endpoint;
   allowing particular video data captured at the first endpoint and the third endpoint to be displayed concurrently at the second endpoint prior to the second endpoint joining the video communication session;
   identifying that the particular video data includes presentation of a human face before allowing the particular video data to be presented on the second endpoint, wherein the identifying is performed without human intervention; and
   identifying a confirmation from the second endpoint to join the video communication session following a display of the particular video data on the second endpoint;
   wherein the first endpoint is not made aware that the particular video data is displayed at the second endpoint prior to the second endpoint joining the video communication session.

2. The method of claim 1, wherein the particular video data is displayed as video data on the second endpoint.

3. The method of claim 1, wherein the particular video data is displayed on the second endpoint as a still image.

4. The method of claim 1, further comprising:
   identifying a presentation of a human face in the particular video data; and
   associating face data corresponding to the presented human face with a video caller using the first endpoint.

5. The method of claim 4, further comprising:
   identifying a response, received at the second endpoint, indicating whether the video communication session with the video caller is desired.

6. The method of claim 5, further comprising:
   identifying that a second request to join a second video communication session includes the video caller based on a facial recognition of preliminary video data, wherein the facial recognition includes a comparison of at least a portion of the preliminary video data with the face data.

7. The method of claim 1, further comprising:
   identifying a denial from the second endpoint declining to join the video communication session following a display of the particular video data on the second endpoint.

8. The method of claim 6, further comprising:
   identifying a response, received at the second endpoint, indicating whether a video communication session with first endpoint is desired; and
   performing an action corresponding to the second request based on the response.

9. The method of claim 8, wherein the action includes associating the identified response with an identifier corresponding to the first endpoint.

10. The method of claim 9, further comprising:
identifying that a second request to join a second video communication session includes an endpoint associated with the identifier; and
generating a response to the second request.

11. The method of claim 8, wherein the action includes a selected one of a group of actions, the group consisting of:
a) blocking the second request;
b) causing an endpoint other than the endpoint associated with the identifier to join the second video communication session;
c) presenting a notification that the second request is associated with the identifier, reporting the second request;
d) joining the second video communication as an audio participant only; and
e) joining the second video communication session anonymously without sharing video data within the session.

12. The method of claim 1, wherein identifying the request from the first endpoint and allowing the particular video data to be displayed at the second endpoint is performed by a video call server used to establish video communication sessions between the second endpoint and at least one other endpoint.

13. The method of claim 1, wherein the request from the first endpoint is identified by the second endpoint and the second endpoint allows the particular video data to be displayed at the second endpoint prior to the second endpoint joining the video communication session.

14. Logic encoded in non-transitory media that includes code for execution and when executed by a processor is operable to perform operations, comprising:
identifying a request, from a first endpoint, for a second endpoint to join a video communication session between the first endpoint and a third endpoint;
allowing particular video data captured at the first endpoint and the third endpoint to be displayed concurrently at the second endpoint prior to the second endpoint joining the video communication session;
identifying that the particular video data includes presentation of a human face before allowing the particular video data to be presented on the second endpoint, wherein the identifying is performed without human intervention; and
identifying a confirmation from the second endpoint to join the video communication session following a display of the particular video data on the second endpoint;
wherein the first endpoint is not made aware that the particular video data is displayed at the second endpoint prior to the second endpoint joining the video communication session.

15. An apparatus, comprising:
a processor;
a memory element; and
a video preview module, the apparatus being configured to:
identify a request, from a first endpoint, for a second endpoint to join a video communication session between the first endpoint and a third endpoint;
allow particular video data captured at the first endpoint and the third endpoint to be displayed concurrently at the second endpoint prior to the second endpoint joining the video communication session;
identify that the particular video data includes presentation of a human face before allowing the particular video data to be presented on the second endpoint, wherein the identifying is performed without human intervention; and
identify a confirmation from the second endpoint to join the video communication session following a display of the particular video data on the second endpoint;
wherein the first endpoint is not made aware that the particular video data is displayed at the second endpoint prior to the second endpoint joining the video communication session.

16. The apparatus of claim 15, further comprising:
a video call server configured to establish video communication sessions between the second endpoint and at least one other endpoint, wherein the video call server includes the video preview module.

17. The apparatus of claim 15, wherein the second endpoint includes the video preview module.

\* \* \* \* \*